United States Patent
Naito

(10) Patent No.: US 9,887,041 B2
(45) Date of Patent: Feb. 6, 2018

(54) ANODE BODY FOR SOLID ELECTROLYTIC CAPACITOR ELEMENTS AND METHOD FOR PRODUCING SAME

(71) Applicant: SHOWA DENKO K.K., Tokyo (JP)

(72) Inventor: Kazumi Naito, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 34 days.

(21) Appl. No.: 14/908,699

(22) PCT Filed: Jul. 16, 2014

(86) PCT No.: PCT/JP2014/068907
§ 371 (c)(1),
(2) Date: Jan. 29, 2016

(87) PCT Pub. No.: WO2015/016066
PCT Pub. Date: Feb. 5, 2015

(65) Prior Publication Data
US 2016/0189875 A1    Jun. 30, 2016

(30) Foreign Application Priority Data

Aug. 1, 2013 (JP) ................. 2013-160481

(51) Int. Cl.
*H01G 9/00* (2006.01)
*H01G 4/06* (2006.01)
(Continued)

(52) U.S. Cl.
CPC .......... *H01G 9/052* (2013.01); *H01G 9/0029* (2013.01); *H01G 9/0032* (2013.01); *H01G 9/025* (2013.01); *H01G 9/07* (2013.01)

(58) Field of Classification Search
CPC ........ H01G 9/052; H01G 9/0029; H01G 9/07; H01G 9/025
(Continued)

(56) References Cited

U.S. PATENT DOCUMENTS 7,206,192 B2    4/2007    Iida et al.
7,349,198 B2    3/2008    Yano et al.
(Continued)

FOREIGN PATENT DOCUMENTS

JP    10-335187 A    12/1998
JP    2004-247550 A    9/2004
(Continued)

OTHER PUBLICATIONS

International Search Report for PCT/JP2014/068907 dated Oct. 28, 2014.

*Primary Examiner* — Eric Thomas
*Assistant Examiner* — Arun Ramaswamy
(74) *Attorney, Agent, or Firm* — Sughrue Mion, PLLC

(57) ABSTRACT

An anode body for a solid electrolytic capacitor element, which is an anode body for a solid electrolytic capacitor element having a dielectric layer on the surface of a sintered body, wherein at least a part of the surface of the valve-acting metal particles constituting the sintered body is covered with a dielectric layer, and a part of the dielectric layer on the particle surface has a larger thickness than the other part; and a method for producing the same, in which a sintered body of a valve-acting metal is immersed in an aqueous solution of an oxidizing agent after being subjected to chemical formation, the resulting sintered body is then immersed in water-soluble alcohol and dried, and the oxidizing agent is removed by water washing.

7 Claims, 1 Drawing Sheet

Portion of the dielectric layer, where thickness is increased

(51) Int. Cl.
*H01G 5/013* (2006.01)
*H01G 9/04* (2006.01)
*H01G 9/145* (2006.01)
*H01G 9/052* (2006.01)
*H01G 9/07* (2006.01)
*H01G 9/025* (2006.01)

(58) Field of Classification Search
USPC .................. 361/523, 524, 528; 29/25.03
See application file for complete search history.

(56) References Cited

U.S. PATENT DOCUMENTS

| | | |
|---|---|---|
| 2006/0279908 A1 | 12/2006 | Omori et al. |
| 2009/0256014 A1 | 10/2009 | Amita et al. |
| 2010/0123993 A1 | 5/2010 | Laor |
| 2013/0050904 A1* | 2/2013 | Nemoto ............... H01G 9/04 361/528 |

FOREIGN PATENT DOCUMENTS

| | | |
|---|---|---|
| JP | 2006-274375 A | 10/2006 |
| JP | 2008-166851 A | 7/2008 |
| JP | 2010-34589 A | 2/2010 |
| JP | 2010-192502 A | 9/2010 |
| JP | 2010-232699 A | 10/2010 |
| JP | 2012-517717 A | 8/2012 |
| WO | 2006/038720 A1 | 4/2006 |

\* cited by examiner

[Fig. 1]
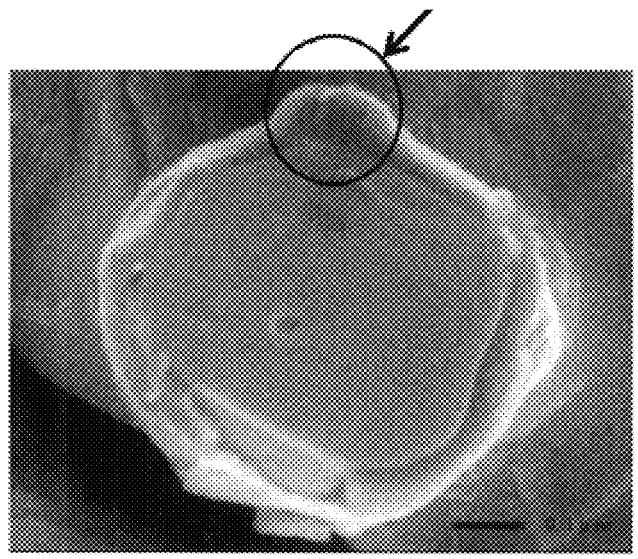
Portion of the dielectric layer, where thickness is increased
[Fig. 2]

ANODE BODY FOR SOLID ELECTROLYTIC CAPACITOR ELEMENTS AND METHOD FOR PRODUCING SAME

CROSS REFERENCE TO RELATED APPLICATIONS

This application is a National Stage of International Application No. PCT/JP2014/068907 filed Jul. 16, 2014, claiming priority based on Japanese Patent Application No. 2013-160481 filed Aug. 1, 2013, the contents of all of which are incorporated herein by reference in their entirety.

TECHNICAL FIELD

The present invention relates to an anode body for a solid electrolytic capacitor element. Specifically, the invention relates to an anode body for a solid electrolytic capacitor element which undergoes a minor decrease in capacitance due to excessive formation of a dielectric layer and a low leakage current; and a method for producing the same.

BACKGROUND ART

When a valve-acting metal is sintered after being molded, it becomes a sintered body having a moderate porosity. When the sintered body is subjected to chemical formation at a predetermined voltage, a dielectric layer having a uniform thickness depending on the applied voltage is formed.

A semiconductor layer laminated on the dielectric layer is formed by chemical and/or electrochemical polymerization by methods such as immersing a sintered body having a dielectric layer formed thereon, which serves as an anode body, in a chemical solution which forms a semiconductor layer.

In anticipation of chemical or physical degradation of the dielectric layer at the time of forming a semiconductor layer in the above described process, a method of forming a thick dielectric layer in advance has been known.

JP 2008-166851 A (U.S. Pat. No. 7,349,198; Patent Document 1) discloses a solid electrolytic capacitor obtained by sequentially forming a first dielectric layer mainly comprising niobium and oxygen, a second dielectric layer containing phosphorus or sulfur, and a cathode on an anode body.

JP 2010-232699 A (U.S. Pat. No. 7,206,192; Patent Document 2) discloses a solid electrolytic capacitor obtained by sequentially forming a first dielectric layer formed by oxidizing a part of an anode body, a second dielectric layer formed on the first dielectric layer, and a cathode on an anode body; in which the oxygen concentration in the second dielectric layer gradually decreases from the first dielectric side to the cathode side.

However, in either method, a dielectric layer becomes thicker as a whole and therefore the decrease in the capacitance with the increased thickness cannot be avoided.

PRIOR ART

Patent Document

Patent Document 1: JP 2008-166851 A (U.S. Pat. No. 7,349,198)
Patent Document 2: JP 2010-232699 A (U.S. Pat. No. 7,206,192)

DISCLOSURE OF THE INVENTION

Problems to be Solved by the Invention

An objective of the present invention is to solve a problem of decrease in the capacitance due to excessive formation of a dielectric layer and to provide a solid electrolytic capacitor element having a low leakage current, while maintaining a high capacitance.

Means to Solve a Problem

The present inventors made intensive studies to achieve the above objective. As a result, the inventors have accomplished the following invention. That is, the present invention relates to the following [1] to [12].

[1] An anode body for a solid electrolytic capacitor element, which is an anode body for a solid electrolytic capacitor element having a dielectric layer on a surface of a sintered body, wherein at least a part of a surface of valve-acting metal particles constituting the sintered body is covered with a dielectric layer, and a part of the dielectric layer on the particle surface has a larger thickness than the other part.

[2] The anode body as described in [1] above, which is an anode body for a solid electrolytic capacitor element having a dielectric layer on the surface of a sintered body, wherein at least a part of the surface of the valve-acting metal particles constituting the sintered body is covered with the dielectric layer, and a thickest part of the dielectric layer has a thickness 1.2 or more times larger than a thinnest part.

[3] The anode body as described in [1] or [2] above, wherein the valve-acting metal is at least one member of tantalum, niobium, titanium, tungsten, and alloy thereof.

[4] A solid electrolytic capacitor element, obtained by forming sequentially a semiconductor layer and a conductor layer on the anode body described in any one of [1] to [3] above.

[5] A method for producing an anode body for a solid electrolytic capacitor element, wherein at least a part of a surface of valve-acting metal particles constituting a sintered body is covered with a dielectric layer, and a part of the dielectric layer on the particle surface has a larger thickness than the other part, comprising a process in which a sintered body of a valve-acting metal is immersed in an aqueous solution of an oxidizing agent after being subjected to chemical formation, then the resulting sintered body is immersed in water-soluble alcohol and dried, and the oxidizing agent is removed by water washing.

[6] The method for producing a solid electrolytic capacitor element as described in [5] above, wherein a thickest part of the dielectric layer has a thickness 1.2 or more times larger than a thinnest part.

[7] The method for producing a solid electrolytic capacitor element as described in [5] or [6] above, wherein the oxidizing agent is an oxidizing agent which is water-soluble and insoluble in alcohol.

[8] The method for producing a solid electrolytic capacitor element as described in any one of [5] to [7] above, wherein the oxidizing agent is a persulfuric acid compound.

[9] The method for producing a solid electrolytic capacitor element as described in any one of [5] to [7] above, wherein the oxidizing agent is at least one member of a halogen acid compound and an organic peroxide.

[10] The method for producing a solid electrolytic capacitor element as described in any one of [5] to [9] above, wherein concentration of the oxidizing agent is 0.1 mass % or more and a saturated solubility or less.

[11] The method for producing a solid electrolytic capacitor element as described in [5] above, wherein the dielectric layer is formed by chemical oxidation and/or electrolytic oxidation.

[12] A method for producing a solid electrolytic capacitor element, comprising sequentially laminating a semiconductor layer and a conductor layer on the anode body obtained by the production method described in any one of [5] to [11] above.

Effects of Invention

The solid electrolytic capacitor element and the capacitor manufactured based on the anode body of the present invention maintain a high capacitance and have a low leakage current.

BRIEF DESCRIPTION OF DRAWINGS

[FIG. 1] A scanning electron microscope image of a fractured surface of the anode body having a dielectric layer on its surface obtained in Example 4.

[FIG. 2] A scanning electron microscope image of a fractured surface of the anode body having a dielectric layer on its surface obtained in Comparative Example 3.

MODE FOR CARRYING OUT INVENTION

When a valve-acting metal is sintered after being molded, the obtained sintered body has an internal space having a complex shape, in which metal particles are three-dimensionally-coupled with each other like beads. When the sintered body is immersed in a chemical formation solution and subjected to chemical formation at a predetermined voltage, a dielectric layer having a uniform thickness depending on the applied voltage is formed on the surface layer of the particles connected together like beads.

Generally, when a semiconductor layer is formed on a dielectric layer, a chemical agent used for forming a semiconductor layer reaches to the 70 to 90% depth of from the surface via the internal space, and a part of the chemical agent disappears due to chemical and/or physical degradation. At that time, it is assumed that the dielectric layer becomes more likely to be degraded due to the chemical agent in the region where the chemical agent easily reaches to within the internal space of the sintered body. As a result, in the region where the chemical agent easily reaches to, the thickness of the dielectric layer becomes thinner, which causes the increase of the leakage current.

Hence, in the anode body for the solid electrolytic capacitor of the present invention, the increase of the leakage current is suppressed while a high capacitance is maintained by making the dielectric layer selectively have a larger thickness in advance in the region where the chemical agent easily reaches to.

The present invention is explained concretely hereinafter.

The solid electrolytic capacitor element regarding an embodiment of the present invention comprises at least a sintered body obtained by sintering a valve-acting metal and a dielectric layer.

Examples of the metal used for a sintered body include a valve-acting metal such as tantalum, niobium, titanium and tungsten; an alloy and a composition mainly comprising these metals; and a conductive oxide of these metals. Two or more kinds of these metals may be mixed and used. The above-mentioned alloy includes the one that is partially alloyed.

The sintered body may contain metals other than those as main components within a scope which does not affect the capacitor characteristics. Metals other than those as main components include valve-acting metal such as tantalum, niobium, aluminum, titanium, vanadium, zinc, molybdenum, hafnium and zirconium.

There is no particular limit on the method for producing a sintered body. For example, in the case where tungsten is used as a valve-acting metal, a sintered body can be obtained by making a molded body by pressure forming of a raw material powder comprising tungsten powder and other metal powder as needed and by sintering the molded body. A binder may be mixed into the raw material powder to facilitate the pressure forming. Various conditions such as the powder amount and the molding equipment can be set appropriately to attain a desired density of the molded body and the like. At the time of pressure formation of the raw material powder, there is a method of embedding and planting an anode lead wire in the formed body which serves as a terminal of the anode body. A metal wire of each valve-acting metal may be used as an anode lead wire. Also, there is a method of connecting an anode lead wire to a sintered body by welding afterward. Instead of a metal wire, a metal plate or a metal foil may be planted in or connected to the sintered body.

There is no particular limit on the sintering temperature and time. However, when a sintering temperature is too high or a sintering time is too long, the space (pores) between the raw material powder particles decreases and the pore volume in the sintered body becomes too low. When a sintering temperature is too low or a sintering time is too short, the sintered body fails to attain sufficient strength and may collapse in some cases. There is no particular limit on the sintering atmosphere, but it is desirable to carry out the sintering under reduced pressure. Also, silicification, boronization or carbonization, and/or the treatment of incorporating nitrogen or phosphorus may be carried out at the time of sintering.

In the present invention, a dielectric layer is formed on a part of the particle surface thicker than the other part by conducting the treatment using an aqueous solution of an oxidizing agent after conducting the chemical formation treatment. The chemical formation treatment and the treatment using an aqueous solution of an oxidizing agent are explained below.

1. Chemical Formation Treatment

Chemical formation treatment can be conducted by chemical oxidation and/or electrolytic oxidation.

Chemical formation treatment by chemical oxidation is conducted by immersing a sintered body in the above-mentioned solution containing an oxidizing agent. The chemical formation treatment may be repeated multiple times.

The chemical formation treatment by electrolytic oxidation is conducted by applying voltage to a sintered body which is immersed in the above-mentioned solution containing an oxidizing agent. The voltage is applied between the sintered body (anode) and a counter electrode (cathode). The current is allowed to pass through the sintered body via an anode lead wire. There is no particular limit on the voltage to be applied or the time period for applying voltage, and they can be determined by an ordinary method.

There is no particular limit on the kind, concentration and the like of the oxidizing agent to be used either, and they can be determined by an ordinary method.

After the chemical formation treatment, the sintered body is washed with pure water. The chemical formation solution is to be removed as much as possible by the washing. After the water washing, it is desirable to remove water attached to the surface or penetrated inside the pores of the sintered body at a temperature lower than the boiling point of the water at the pressure at the time of removal. Conducting this operation before the high-temperature drying treatment to be described later can suppress the degradation of the dielectric layer and make it easy to maintain the capacitance in a high-frequency region. Water can be removed by, for example, bringing the water into contact with a water-miscible solvent. As a water-miscible solvent, alcohol and the like used in an ordinary method can be used.

After removing water, the high-temperature drying treatment is conducted. There is no particular limit on the drying temperature, but if the temperature is too low, it will not cause an effect of increasing the capacitance in a high-frequency region and result in piece-to-piece variation in the capacitance of the elements in some cases. When the temperature is too high, it may increase the leakage current or dielectric loss tangent.

There is no particular limit on the drying time as long as the stability of the dielectric layer can be maintained.

2. Treatment Using an Aqueous Solution of an Oxidizing Agent

The sintered body subjected to chemical formation treatment as described above is immersed in an aqueous solution of an oxidizing agent, and then immersed in alcohol. After immersing the sintered body in an aqueous solution of an oxidizing agent, it is desirable to transfer the sintered body into the state being immersed in alcohol as soon as possible.

The oxidizing agent used here is preferably an oxidizing agent which is water-soluble and insoluble in alcohol. Specifically, examples of the oxidizing agent include at least one member selected from the group consisting of a halogen acid compound such as perchloric acid, chlorous acid, hypochlorous acid and salts thereof; an organic peroxide such as peracetic acid, perbenzoic acid and salts or derivatives thereof; and persulfuric acid compound comprising persulfuric acid and salts thereof. Among these, preferred is a persulfric acid compound such as ammonium persulfate, potassium persulfate and potassium peroxymonosulfate from the viewpoint of handleability, stability as an oxidizing agent, water solubility and alcohol insolubility. These oxidizing agents can be used singly or in combination of two or more thereof. As a solvent to dissolve the oxidizing agent, water is preferable.

Since the above-mentioned oxidizing agent is water soluble and insoluble in alcohol, when the sintered body is immersed in alcohol after the treatment using an aqueous solution of an oxidizing agent, only water of the aqueous solution of an oxidizing agent is to be removed. As a result, alcohol, trace amounts of water unremoved by alcohol, and precipitated oxidizing agent remain in the internal space of the dielectric layer. Subsequently, when the sintered body is dried by heating, the metal in the region where the oxidizing agent remains is oxidized and the sintered body thickened only in that region.

The region where the dielectric layer is thickened by the above-mentioned operation is a part which the aqueous solution of the oxidizing agent penetrates easily and is also a part which the chemical agent used in the subsequent process of forming a semiconductor layer penetrates easily: i.e. a part where the dielectric layer is liable to degrade by the penetration of the chemical agent. By the above-mentioned operation, it is possible to thicken the dielectric layer selectively in such a part only, and as a result, a thick dielectric layer can be formed in the region where the dielectric layer is likely to degrade due to the penetration of the chemical agent.

The concentration of the oxidizing agent in the aqueous solution is preferably 0.1 mass % or higher and a saturated solubility or less, more preferably 0.15 mass % or higher and a saturated solubility or less, and still more preferably 0.2 mass % or more and a saturated solubility or less. When the concentration of the oxidizing agent is less than 0.1 mass %, a dielectric layer having a sufficient thickness cannot be formed by immersing the sintered body in the aqueous solution of the oxidizing agent only once, and the degradation of leakage current cannot be prevented. Although it is possible to increase the penetration amount into the internal space of the sintered body by immersing the sintered body in the aqueous solution multiple times, there is concern about unexpected oxidation in this case. Accordingly, it is desirable to set the concentration of the chemical formation solution within the above-mentioned range and to set the number of times of immersing the sintered body to one.

The temperature for drying alcohol, trace amounts of water and oxidizing agent remaining in the internal space of the sintered body after immersing the sintered body in alcohol is preferably 100° C. or higher. It is also possible to dry them at a temperature lower than 100° C. under reduced-pressure conditions. In the case where the drying is conducted at a temperature lower than 100° C., the temperature can be determined by examining the oxidation reaction temperature of the oxidizing agent to be used.

Regarding the drying time, a dielectric layer having a desired thickness can be formed in several minutes to several tens of minutes. Eventually, the time period for drying is to be determined by a preliminary experiment considering the size of the anode body, powder particle diameter of the valve-acting metal particles, and the kind and the concentration of the oxidizing agent to be used. After drying, it is desirable to remove the oxidizing agent by washing the sintered body with water.

By the above-described operations, a dielectric layer having a larger thickness on a part of the particle surface layer than the other part can be formed. The thickest part of the dielectric layer has a thickness preferably 1.2 or more times, more preferably 1.2 to 3 times, and still more preferably 1.5 to 3 times larger than the thinnest part.

Here, "the thickest part" and "the thinnest part" of the dielectric layer mean the thickest part and the thinnest part of the dielectric layer, respectively, which are measured by observing the fractured surface of the sintered body having a dielectric layer formed thereon by a scanning electron microscope and the like.

A semiconductor layer is formed on the dielectric layer formed by the above-described method. A semiconductor layer employed in conventional solid electrolytic capacitor elements can be used without any limit. Furthermore, a conductor layer such as a carbon paste layer, a silver paste layer or a metal plated layer can be formed on the semiconductor layer.

A cathode lead is electrically connected to the above-mentioned conductor layer, and a part of the cathode lead is exposed outside the package of the electrolytic capacitor to serve as a cathode external terminal. On the other hand, in an anode body, a part of the anode lead is exposed outside the package of the capacitor to serve as an anode external terminal. For installing the cathode lead and the anode lead, common lead frames can be used. Subsequently, a package is formed by sealing with resin and the like to obtain a capacitor. The thus-fabricated capacitor may be subjected to the aging treatment if desired. The capacitor of the present invention can be used by being mounted on various electric circuits or electronic circuits.

EXAMPLES

The present invention is described below in more detail by referring to Examples and Comparative Examples, but the present invention is not limited thereto.

Examples 1 to 2

[Production of a Sintered Body]

A tantalum (Ta) primary powder (average particle diameter: 0.6 μm) was obtained by reducing potassium fluorotantalate with sodium. By granulating the primary powder, a secondary powder (average particle diameter: 115 μm) was obtained. The secondary powder was molded and sintered to obtain a sintered body (size of 1.0×2.3×1.7 mm; a tantalum wire was planted in the center of the 1.0×2.3 mm face).

[Formation of a Dielectric Layer]

1. Chemical Conversion Process

The sintered body was immersed in an aqueous solution of 2 mass % phosphoric acid and subjected to chemical formation treatment at 60° C. with a voltage of 20 V for five hours. When observing the fractured surface of the sintered body subjected to the chemical formation treatment by a scanning electron microscope JSM-7500FA manufactured by JEOL Ltd., it was confirmed that a dielectric layer having a uniform thickness (about 36 to 39 nm) covered the surface of the primary particles.

2. Treatment Using an Aqueous Solution of an Oxidizing Agent

After washing the sintered body with water, removing water and drying the sintered body, the sintered body was immersed in an aqueous solution of saturated ammonium persulfate for one minute in Example 1 and immersed in an aqueous solution of 0.2% mass ammonium persulfate for five minutes in Example 2. After immersing the sintered body in an aqueous solution of an oxidizing agent, the treated sintered body was pulled out of the solution and promptly immersed in ethanol for 10 minutes. Subsequently, after drying the sintered body at 125° C. for 15 minutes, the sintered body was washed with water to remove the solute of the oxidizing agent remaining in the internal space of the dielectric layer, and dried to remove water.

[Process for Forming a Semiconductor Layer, a Carbon Layer and a Silver Layer]

Using the sintered body having a dielectric layer formed thereon by the above-described operation as an anode body, pyrrole was electrolytically polymerized by using benzoquinone sulfonic acid as a dopant according to an ordinary method to form a semiconductor layer comprising a conductive polymer. Next, a carbon layer and a silver layer were laminated sequentially by an ordinary method to fabricate a solid electrolytic capacitor element.

By observing the fractured surface of the obtained anode body by a scanning electron microscope, it was confirmed that a part of the dielectric layer had a larger thickness than the other parts. It was confirmed that a part of the dielectric layer on the particle surface had a thickness of about 80 nm in both of Example 1 and Example 2.

Comparative Example 1

A solid electrolytic capacitor element was produced in the same way as in Example 1 except that the treatment using an aqueous solution of an oxidizing agent was not conducted. Via observation by a scanning electron microscope, it was confirmed that a dielectric layer having a uniform thickness (about 36 to 39 nm) covered the surface of the primary particles.

Example 3

A solid electrolytic capacitor element was produced in the same way as in Example 1 except that a primary powder obtained by pulverizing a hydrogen storage niobium (Nb) ingot (average particle diameter: 0.4 μm) was used instead of a tantalum primary powder; a secondary powder having an average particle diameter of 100 μm was obtained by granulating the primary powder; and the time period for immersing the sintered body in an aqueous solution of an oxidizing agent was changed to five minutes. It was confirmed via observation by a scanning electron microscope that although the dielectric layer after the chemical formation treatment had a uniform thickness of 42 to 46 nm, the dielectric layer after the treatment using an aqueous solution of an oxidizing agent had a thickness of 70 nm on a part of the surface layer of the primary particles.

Comparative Example 2

A solid electrolytic capacitor element was produced in the same way as in Example 3 except that the treatment using an aqueous solution of an oxidizing agent was not conducted. Via observation by a scanning electron microscope, it was confirmed that a dielectric layer having a uniform thickness (about 42 to 46 nm) covered the surface of the primary particles.

Example 4

A solid electrolytic capacitor element was produced in the same way as in Example 2 except that a primary powder obtained by reducing tungsten trioxide with hydrogen (average particle diameter: 0.5 μm) was used instead of a tantalum primary powder; a secondary powder (average particle diameter: 85 μm) was obtained by mixing 0.2 mass % of silicon powder (average particle diameter: 0.7 μm) into the primary powder and granulating the mixture; the chemical formation was carried out at 15 V by using an aqueous solution of 0.5 mass % of ammonium persulfate instead of an aqueous solution of 2 mass % of phosphoric acid; the oxidizing agent was changed to 0.2% mass potassium persulfate; and the oxidizing agent was dried at 105° C. for 10 minutes. It was confirmed via observation by a scanning electron microscope that although the dielectric layer after the chemical formation treatment had a uniform thickness of 38 to 42 nm, the dielectric layer after the treatment using an aqueous solution of an oxidizing agent had a thickness of 90 nm on a part of the surface layer of the primary particles. The results of the observation by scanning electron microscope ($10^5$ magnifications) is shown in FIG. 1.

Comparative Example 3

A solid electrolytic capacitor element was produced in the same way as in Example 4 except that the treatment using an aqueous solution of an oxidizing agent was not conducted.

Via observation by a scanning electron microscope, it was confirmed that a dielectric layer having a uniform thickness (about 38 to 42 nm) covered the surface of the primary particles. The results of the observation by scanning electron microscope ($10^5$ magnifications) is shown in FIG. 2.

Comparative Example 4

A solid electrolytic capacitor element was produced in the same way as in Comparative Example 3 except that the chemical formation voltage was changed to 25 V. Via observation by a scanning electron microscope, it was confirmed that a dielectric layer having a uniform thickness (about 48 to 52 nm) covered the surface of the primary particles.

The results of the measurement of the capacitance and leakage current according to the method as described below are shown in Table 1.

[Capacitance]

The capacitance at 120 Hz with a bias voltage of 4 V was measured by putting leads wired to an LCR meter manufactured by Agilent Technologies to the conductor layer of the solid electrolytic capacitor element and the anode lead wire planted in the solid electrolytic capacitor element, respectively.

[Leakage Current]

Voltage of 4 V was applied to a solid electrolytic capacitor element at room temperature. The current (leakage current) of the circuit from the plus terminal of the power source via the anode lead wire of the solid electrolytic capacitor element and the conductor layer of the solid electrolytic capacitor element to the minus terminal of the power source was measured after the lapse of 30 seconds after applying the voltage.

As shown in Table 1, The solid electrolytic capacitor elements of the present invention (Examples 1 to 4) have an equal or higher capacitance and low leakage current compared to the solid electrolytic capacitor elements in Comparative Examples (Comparative Examples 1 to 4).

The dielectric layer has an almost uniform thickness in the solid electrolytic capacitor elements which were not subjected to the treatment using an aqueous solution of an oxidizing agent (see Comparative Example 3 and FIG. 2). In contrast, a difference is made in the thickness of the dielectric layer in the solid electrolytic capacitor element of the present invention (see Example 4 and FIG. 1): i.e. a thick part of the dielectric layer has a thickness about 1.5 to three times larger than a thin part.

From the results set forth above, it was confirmed that the leakage current of the solid electrolytic capacitor element can be kept low when a difference is made in the thickness of the dielectric layer.

The invention claimed is:

1. A method for producing an anode body for a solid electrolytic capacitor element, wherein at least a part of a surface of valve-acting metal particles constituting a sintered body is covered with a dielectric layer, and a thickest part of the dielectric layer has a thickness 1.5 to three times larger than a thinnest part of the dielectric layer, comprising a process in which a sintered body of a valve-acting metal is immersed in an aqueous solution of an oxidizing agent after being subjected to chemical formation, then the resulting sintered body is immersed in water-soluble alcohol, the sintered body is dried by heating at 100° C. or higher, thereby oxidizing the valve-acting metal being in contact with the oxidizing agent, and then the oxidizing agent is removed by water washing.

2. The method for producing a solid electrolytic capacitor element as claimed in claim 1, wherein the oxidizing agent is an oxidizing agent which is water-soluble and insoluble in alcohol.

3. The method for producing a solid electrolytic capacitor element as claimed in claim 1, wherein the oxidizing agent is a persulfuric acid compound.

TABLE 1

| | Production conditions and the like | | | | After the chemical formation treatment [nm] | Results of observation by scanning electron microscope | | Performance of the element (2*) | |
|---|---|---|---|---|---|---|---|---|---|
| | | | | | | Thickness of the dielectric layer | | | |
| | | | Treatment using an aqueous solution of an oxidizing agent | | | After the treatment using an aqueous solution of an oxidizing agent (1*) [nm] | Thickness of the thickest part/ thickness of the thinnest part of the dielectric layer | | |
| | Sintered body Constituent metal | Formation Voltage [V] | An aqueous solution of an oxidizing agent | Immersion time [min] | | | | Capacitance [μF] | LC [μA] |
| Example 1 | Ta | 20 | Saturated ammonium persulfate | 1 | 36-39 | About 80 | About 2.2 times | 47 | 5 |
| Example 2 | | | 0.2% ammonium persulfate | 5 | | About 80 | About 2.2 times | 47 | 6 |
| Comparative Example 1 | | | No treatment using an aqueous solution of an oxidizing agent | | | — | — | 49 | 16 |
| Example 3 | Nb | 20 | Saturated ammonium persulfate | 5 | 42-46 | About 70 | About 1.7 times | 46 | 18 |
| Comparative Example 1 | | | No treatment using an aqueous solution of an oxidizing agent | | | — | — | 49 | 73 |
| Example 4 | W | 15 | 0.2% potassium persulfate | 5 | 38-42 | About 90 | About 2.4 times | 100 | 20 |
| Comparative Example 3 | | | No treatment using an aqueous solution of an oxidizing agent | | | — | — | 104 | 97 |
| Comparative Example 4 | | 25 | | | 48-52 | — | — | 36 | 6 |

(*1): The thickness of the dielectric portion where the thickness was increased by the treatment using an aqueous solution of an oxidizing agent was measured.
(*2): The values regarding the performance of the element are an average for n = 20.

4. The method for producing a solid electrolytic capacitor element as claimed in claim 1, wherein the oxidizing agent is at least one member of a halogen acid compound and an organic peroxide.

5. The method for producing a solid electrolytic capacitor element as claimed in claim 1, wherein concentration of the oxidizing agent is 0.1 mass % or more and a saturated solubility or less.

6. The method for producing a solid electrolytic capacitor element as claimed in claim 1, wherein the dielectric layer is formed by chemical oxidation and/or electrolytic oxidation.

7. A method for producing a solid electrolytic capacitor element, comprising sequentially laminating a semiconductor layer and a conductor layer on the anode body obtained by the production method claimed in claim 1.

* * * * *